United States Patent
Soga et al.

(10) Patent No.: US 12,300,819 B2
(45) Date of Patent: May 13, 2025

(54) NEGATIVE ELECTRODE FOR SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Masahiro Soga, Osaka Fu (JP); Masaki Hasegawa, Osaka Fu (JP); Takahiro Fukuoka, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 591 days.

(21) Appl. No.: 17/639,118

(22) PCT Filed: Jul. 21, 2020

(86) PCT No.: PCT/JP2020/028283
§ 371 (c)(1),
(2) Date: Feb. 28, 2022

(87) PCT Pub. No.: WO2021/039217
PCT Pub. Date: Mar. 4, 2021

(65) Prior Publication Data
US 2022/0302451 A1      Sep. 22, 2022

(30) Foreign Application Priority Data

Aug. 30, 2019   (JP) .................................. 2019-158076

(51) Int. Cl.
*H01M 4/587*     (2010.01)
*H01M 4/36*      (2006.01)
(Continued)

(52) U.S. Cl.
CPC ........... *H01M 4/587* (2013.01); *H01M 4/364* (2013.01); *H01M 4/48* (2013.01); *H01M 4/624* (2013.01);
(Continued)

(58) Field of Classification Search
CPC ........ H01M 4/587; H01M 4/364; H01M 4/48; H01M 4/624; H01M 10/0525;
(Continued)

(56) References Cited

U.S. PATENT DOCUMENTS 9,017,865 B2 *   4/2015  Sano ....................... H01M 6/16
                                                              429/199
2006/0127773 A1   6/2006  Kawakami et al.
(Continued)

FOREIGN PATENT DOCUMENTS

| CN | 103400971 A | 11/2013 |
|----|-------------|---------|
| CN | 103441250 A | 12/2013 |

(Continued)

OTHER PUBLICATIONS

International Search Report dated Sep. 1, 2020, issued in counterpart International Application No. PCT/JP2020/028283, w/English Translation. (5 pages).
(Continued)

*Primary Examiner* — Abdullah A Riyami
*Assistant Examiner* — Nader J Alhawamdeh
(74) *Attorney, Agent, or Firm* — WHDA, LLP

(57) ABSTRACT

A negative electrode for a secondary battery including a negative electrode active material capable of absorbing and releasing lithium ions. The negative electrode active material includes a first carbon material as a main component, and includes a second carbon material and a silicon-containing material which are present between particles of the first carbon material. The first carbon material has an aver-
(Continued)

age particle diameter A, the second carbon material has an average particle diameter B, and the silicon-containing material has an average particle diameter C, satisfying A>C≥B.

9 Claims, 1 Drawing Sheet

(51) Int. Cl.
*H01M 4/48* (2010.01)
*H01M 4/62* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(58) Field of Classification Search
CPC ..... H01M 2004/021; H01M 2004/027; H01M 4/483; H01M 4/133; Y02E 60/10
See application file for complete search history.

(56) References Cited

U.S. PATENT DOCUMENTS

| | | | |
|---|---|---|---|
| 2006/0166098 | A1 | 7/2006 | Tabuchi et al. |
| 2010/0021817 | A1 | 1/2010 | Kawakami et al. |
| 2010/0323241 | A1 | 12/2010 | Kawakami et al. |
| 2013/0273433 | A1* | 10/2013 | Jouanneau-si Larbi ............ H01M 4/133 252/502 |
| 2015/0086870 | A1* | 3/2015 | Fukasawa ............ H01M 4/131 429/218.1 |
| 2016/0322637 | A1 | 11/2016 | Nakanishi et al. |
| 2017/0365857 | A1* | 12/2017 | Isozaki ................ H01M 4/622 |
| 2018/0159125 | A1 | 6/2018 | Kamimura et al. |
| 2019/0027783 | A1 | 1/2019 | Matsushita et al. |
| 2020/0176753 | A1* | 6/2020 | Lee ........................ H01M 4/366 |
| 2020/0350591 | A1 | 11/2020 | Uchiyama et al. |
| 2021/0296705 | A1* | 9/2021 | Morioka ........... H01M 10/0525 |
| 2023/0318129 | A1* | 10/2023 | Uchida ................ H01M 4/625 429/212 |

FOREIGN PATENT DOCUMENTS

| | | |
|---|---|---|
| JP | 2004-349164 A | 12/2004 |
| JP | 2007-165061 A | 6/2007 |
| JP | 2014-503972 A | 2/2014 |
| JP | 2014-67583 A | 4/2014 |
| JP | 2014-107013 A | 6/2014 |
| JP | 2015-125815 A | 7/2015 |
| WO | 2015/145522 A1 | 10/2015 |
| WO | 2019/064547 A1 | 4/2019 |
| WO | 2019/107033 A1 | 6/2019 |

OTHER PUBLICATIONS

Office Action dated Aug. 22, 2023, issued in counterpart CN application No. 202080060443.3, with partial English translation. (12 pages).

* cited by examiner

NEGATIVE ELECTRODE FOR SECONDARY BATTERY, AND NON-AQUEOUS ELECTROLYTE SECONDARY BATTERY

TECHNICAL FIELD

The present disclosure mainly relates to an improvement of a negative electrode for a secondary battery.

BACKGROUND ART

A non-aqueous electrolyte secondary battery represented by a lithium ion secondary battery includes a positive electrode, a negative electrode, and a non-aqueous electrolyte. The negative electrode includes a negative electrode material mixture including a negative electrode active material capable of electrochemically absorbing and releasing lithium ions. Attempts have been made to use a silicon-containing material with high capacity as a negative electrode active material.

Patent Literature 1 teaches a non-aqueous electrolyte secondary battery including a negative electrode active material which is a mixture of a lump graphite, a flake graphite, and a silicon oxide represented by $SiO_x$, where $0.5 \leq x < 1.6$. The silicon oxide represented by $SiO_x$, where $0.5 \leq x < 1.6$, is contained by 1 to 5 mass %, relative to the whole graphite material. The flake graphite having an average particle diameter (D50), the ratio of which to the average particle diameter (D50) of the lump graphite is ½ to ¼, is contained by 5 to 15 mass %, relative to the whole graphite.

CITATION LIST

Patent Literature

[PTL 1] Japanese Laid-Open Patent Publication No. 2014-67583

SUMMARY OF INVENTION

The $SiO_x$ proposed by Patent Literature 1 expands considerably during charge and contracts during the subsequent discharge, resulting in poor electrical contact between the $SiO_x$ and the surrounding graphite material. The flake graphite allows conductive paths to be formed between the $SiO_x$ and the lump graphite, which can improve the cycle characteristics, but the improvement is not sufficient. Especially when the silicon-containing material expands and contracts more considerably, this easily causes isolation of silicon, making it more difficult to maintain the conductive paths. The isolation of silicon occurs due to cracking and like associated with the expansion of silicon.

One aspect of the present disclosure relates to a negative electrode for a secondary battery, including: a negative electrode active material capable of absorbing and releasing lithium ions, wherein the negative electrode active material includes a first carbon material as a main component, and includes a second carbon material and a silicon-containing material which are present between particles of the first carbon material, and the first carbon material has an average particle diameter A, the second carbon material has an average particle diameter B, and the silicon-containing material has an average particle diameter C, satisfying $A > C \geq B$.

Another aspect of the present disclosure relates to a non-aqueous electrolyte secondary battery, including: the above-described negative electrode; a positive electrode; and a non-aqueous electrolyte.

When a silicon-containing material is used in a negative electrode for a secondary battery, excellent discharge capacity and cycle characteristics can be obtained.

DESCRIPTION OF EMBODIMENTS

Figure 1:
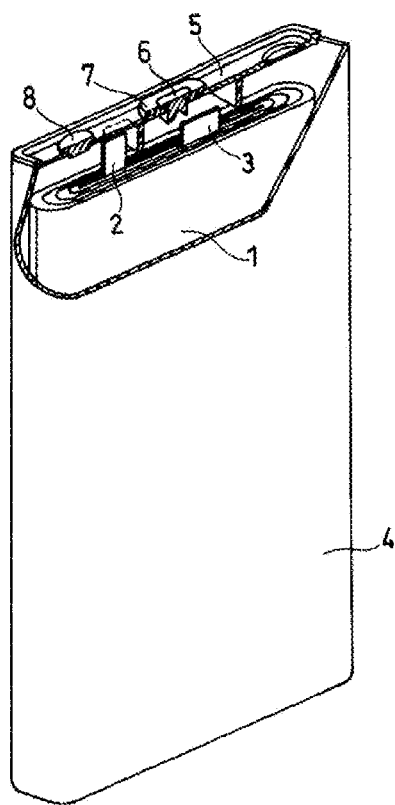
FIG. 1 A partially cut-away schematic oblique view of a non-aqueous electrolyte secondary battery according to one embodiment of the present disclosure.

A negative electrode for a secondary battery according to an embodiment of the present disclosure includes, as an essential component, a negative electrode active material capable of absorbing and releasing lithium ions. The negative electrode active material includes a first carbon material, a second carbon material, and a silicon-containing material. The second carbon material and the silicon-containing material are present between particles of the first carbon material. In other words, the second carbon material and the silicon-containing material are packed in the gaps between the particles of the first carbon material.

The first carbon material is a main component of the negative electrode active material. For example, the content of the first carbon material in the negative electrode active material is 75 mass % or more, and may be 80 mass % or more.

On the other hand, the content of the second carbon material in the negative electrode active material may be, for example, 1 to 15 mass %, and may be 2 to 10 mass %.

The content of the silicon-containing material in the negative electrode active material may be 1 to 15 mass %, and may be 2 to 10 mass %.

Here, the first carbon material has an average particle diameter A, the second carbon material has an average particle diameter B, and the silicon-containing material has an average particle diameter C, satisfying $A > C \geq B$. When $A > C \geq B$, the current-collecting performance of the negative electrode can be significantly improved, the discharge capacity can be increased, and the cycle characteristics can be improved.

By including the silicon-containing material in the ratio as above in the negative electrode active material, the expansion and contraction of the whole negative electrode tends to be suppressed even when the silicon-containing material severely expands and contracts repetitively. This is presumably because, when $A > C$, the silicon-containing material can enter relatively large gaps formed by the first carbon material.

The ratio: A/C of the average particle diameter A of the first carbon material to the average particle diameter C of the silicon-containing material may be, for example, 1.8 or greater and 4 or less. By setting the A/C ratio within the range as above, the expansion and contraction of the whole negative electrode can be more effectively suppressed.

Next, by including the second carbon material in the ratio as above in the negative electrode active material, the conductive paths between the first carbon material and the silicon-containing material tends to be maintained even when the silicon-containing material severely contracts during discharge, causing, for example, cracks in the silicon-containing material. This is presumably because, when C≥B, even though the silicon-containing material cracks and its particle size is reduced, the silicon-containing material is unlikely to be extremely smaller than the second carbon material having a small particle diameter, and the second carbon material can easily enter together with the silicon-containing material into the gaps between the first carbon material particles. At this time, the silicon-containing material and the first carbon material can be present in a mixed state between the first carbon material particles.

The ratio: CB of the average particle diameter C of the silicon-containing material to the average particle diameter B of the second carbon material may be, for example, 1 or greater and 5 or less. By setting the B/C ratio within the range as above, the second carbon material can be more easily enter together with the silicon-containing material between the first carbon material particles, and furthermore, the silicon-containing material and the first carbon material are more likely to be mixed between the first carbon material particles. The C/B ratio may be 1 or greater and 4 or less, and may be 1.2 or greater and 3.6 or less.

On the other hand, in the case of A>B but C<B, when the silicon-containing material cracks and its particle size is reduced, the difference in particle size between the silicon-containing material having a small particle diameter and the second carbon material further increases, and the silicon-containing material and the second carbon material can hardly be present in a mixed state between the first carbon material particles.

The ratio: A/B of the average particle diameter A of the first carbon material to the average particle diameter B of the second carbon material may be, for example, 2 or greater and 15 or less. By setting the A/B to be 2 or greater, the second carbon material is allowed to enter more easily between the first carbon material particles. By setting the A/B to be 15 or less, the difference in particle size between the first carbon material and the second carbon material is unlikely to increase too much, and both materials can be each designed to have an appropriate particle diameter and surface area. The A/B ratio may be 3 or greater and 10 or less, and may be 3.5 or greater and 5 or less.

Here, the average diameter means a particle diameter (volume average particle diameter) at 50% cumulative volume in a particle size distribution measured by a laser diffraction/scattering method. For the measurement, for example, "LA-750", available from Horiba, Ltd. (HORIBA) can be used. For example, a negative electrode active material taken out from a negative electrode is measured by a laser diffraction/scattering method, to give a distribution having three peaks of the first carbon material, the silicon-containing material, and the second carbon material. By subjecting these peaks to peak separation, a particle size distribution for each of the first carbon material, the silicon-containing material and the second carbon material can be obtained. By analyzing the particle size distribution, a volume average particle diameter can be obtained.

The average particle diameter A of the first carbon material may be, for example, 10 μm or more, and may be 15 μm or more. The average particle diameter A may be, for example, 26 μm or less. By setting the average particle diameter A within the range as above, the side reaction tends to be suppressed, and a high capacity can be easily achieved.

The average particle diameter B of the second carbon material may be, for example, less than 10 μm, and may be 8 μm or less. The average particle diameter B may be, for example, 2 μm or more. By setting the average particle diameter B within the range as above, good conductive paths tend to be formed between the negative electrode active materials, and excellent discharge capacity and cycle characteristics can be easily achieved.

The average particle diameter C of the silicon-containing material is selected so as to satisfy A>C≥B, but may be, for example, 4 μm or more and 15 μm or less, may be 5 μm or more and 13 μm or less, and may be 6 μm or more and 11 μm or less. By setting the average particle diameter C within the range as above, the stress caused by changes in volume of the silicon-containing material during charge and discharge tends to be reduced, preventing the isolation of the silicon-containing material, and leading to excellent cycle characteristics. The surface area of the silicon-containing material also becomes appropriate, and the capacity reduction due to the side reaction with the electrolyte can be suppressed.

The content of the second carbon material in the negative electrode active material is 1 mass % or more and 15 mass % or less, and may be 3 mass % or more and 12 mass % or less, and may be 5 mass % or more and 10 mass % or less. When the content of the second carbon material is less than 1 mass %, only a few conductive paths are formed by the second carbon material, and excellent discharge capacity and cycle characteristics are difficult to be achieved. On the other hand, when the content of the second carbon material exceeds 15 mass %, the contribution of the second carbon material to the negative electrode active material increases, the specific surface area of the whole negative electrode active material increases, and the initial efficiency tends to be reduced due to the side reaction.

The content of the silicon-containing material in the negative electrode active material is 1 to 15 mass %, and may be 3 mass % or more and 12 mass % or less, and may be 5 mass % or more and 10 mass % or less. When the content of the silicon-containing material is less than 1 mass %, the silicon-containing material cannot sufficiently improve the negative electrode capacity. On the other hand, when the content of the silicon-containing material exceeds 15 mass %, the contribution of the silicon-containing material to the negative electrode active material increases, and the expansion and contraction of the negative electrode during charge and discharge becomes severe, making it difficult to maintain the conductive paths, and resulting in deterioration in the cycle characteristics.

The content of the first carbon material in the negative electrode active material may be, for example, 75 mass % or more, and may be 80 mass % or more. In other words, the first carbon material is a main component of the negative electrode active material. By including the first carbon material having a relatively large average particle diameter as a main component, the side reaction of the whole negative electrode can be easily suppressed, and a high capacity can be easily achieved.

The negative electrode active material may include a material capable of absorbing and releasing lithium ions, in addition to the first carbon material, the second carbon material, and the silicon-containing material. For example, the negative electrode active material may further contain another carbon material, in addition to the first carbon material and the second carbon material. The total content of the first carbon material, the second carbon material and the silicon-containing material in the whole negative electrode active material is desirably 90 mass % or more, and more desirably 95 mass % or more. In this case, the effect exerted by the co-presence of the first carbon material, the second carbon material, and the silicon-containing material, that is, the facilitated formation and stabilization of the conductive paths, can be remarkable. Likewise, the total content of the first carbon material and the second carbon material in the whole carbon material contained in the negative electrode active material is desirably 90 mass % or more, and more desirably 95 mass % or more.

(First Carbon Material)

Examples of the first carbon material include graphite material, non-graphitizable carbon, graphitizable carbon, and amorphous carbon. These may be used singly, or in combination of two or more kinds. Particularly preferred is graphite material. Graphite material is the collective name for carbon materials having a graphite structure. The graphite material is excellent in charge and discharge stability, and has a small irreversible capacity.

Here, graphite refers to a carbon material having an average interplanar spacing d002 of the (002) plane as measured by an X-ray diffraction method of 0.340 nm or less.

The graphite material includes natural graphite, artificial graphite, graphitized mesophase carbon particles, and the like. Although it is advantageous to use natural graphite in terms of cost, artificial graphite is preferred in terms of performance. Natural graphite and artificial graphite may be used in combination, and natural graphite and artificial graphite may be used by forming them into a composite.

The graphite material used as the first carbon material may be lump graphite. Lump graphite means a graphite material having a smaller aspect ratio (or higher circularity) than flake graphite. Given that the length in the major axis direction of the graphite particle (i.e., the maximum length) is denoted by A, and the length in the minor axis direction thereof (i.e., the maximum length in the direction perpendicular to the maximum length A) is denoted by B, the aspect ratio of the graphite material is expressed as A/B. The aspect ratio is at minimum 1. The graphite particles having an aspect ratio of less than 5 are lump graphite, and the graphite particles having an aspect ratio of 5 or more are, for example, flake graphite.

The aspect ratio may be obtained from a scanning electron microscope (SEM) photograph of the graphite particles. For example, the A/B ratio is measured with respect to randomly selected 100 graphite particles, and the arithmetic mean of the measured values may be determined as an aspect ratio.

When using artificial graphite, lump graphite can be obtained by, for example, granulating coke serving as a main raw material, and then baking and crushing it into a predetermined size, which is then sieved. When using natural graphite, lump graphite can be obtained by spheroidizing flake natural graphite, which is then sieved. The lump graphite may have a surface layer of amorphous carbon. The surface layer of amorphous carbon can be formed by, for example, mixing massing graphite and petroleum pitch under heat in an inert gas atmosphere, and baking the mixture, which is then pulverized and classified.

(Second Carbon Material)

Examples of the second carbon material also include graphite material, non-graphitizable carbon, graphitizable carbon, and amorphous carbon. These may be used singly, or in combination of two or more kinds. Particularly preferred is graphite material.

The graphite material used as the second carbon material may be flake graphite. The aspect ratio (A/B ratio) of the flake graphite is 5 or greater. The flake graphite can be obtained by pulverizing natural graphite or artificial graphite into flakes, and baking them, if necessary, which are then pulverized and classified.

(Silicon-Containing Material)

The silicon-containing material may be any material that contains silicon having a higher capacity than the carbon material. It is to be noted, however, with silicon alone, the material tends to be finer and finer as it expands and contracts during charge and discharge. It is therefore desirable to use a composite material of a lithium ion conductive phase and silicon particles dispersed in the lithium ion conductive phase. By dispersing the silicon particles in the lithium ion conductive phase, the particle size reduction due to expansion and contraction of the silicon particles can be remarkably suppressed.

When the lithium ion conductive phase lacks in electron conductivity, the silicon-containing material may be at least partially covered with an electrically conductive layer. The conductive layer is formed of a material having electron conductivity, and may be formed of, for example, a carbon material. By at least partially covering the surface of the silicon-containing material with the conductive layer, the conductivity can be significantly improved. The conductive layer is preferably thin enough not to substantially influence the average particle diameter of the silicon-containing material.

A composite material of a lithium ion conductive phase and silicon particles will be described below by way of examples.

(First Composite Material)

A first composite material has a silicate as a lithium ion conductive phase. That is, the first composite material (hereinafter sometimes referred to as an LSX material) has a silicate phase and silicon particles dispersed in the silicate phase. The silicate is a silicate compound containing at least one selected from the group consisting of alkali metal elements and Group 2 elements. The silicate, which is formed of a salt of a cation of a metal element and a silicate anion, has a small irreversible capacity and is unlikely to capture lithium ions therein. Therefore, excellent initial efficiency can be easily achieved.

The first composite material can be produced by forming a silicate and silicon into a composite. The silicate and the silicon may be mixed at any ratio. In other words, by increasing the ratio of the silicon to the silicate, a first composite material with a desired high capacity can be obtained. It is to be noted, however, that with increasing the ratio of the silicon to the silicate, the changes in volume of the silicate particles associated with their expansion and contraction during charge and discharge increase significantly. In such a case, simply using the first carbon material and the second carbon material satisfying A>B is not sufficient to achieve excellent cycle characteristics. It is important to additionally use a silicon-containing material satisfying C≥B.

In view of achieving a higher capacity, the silicon particles, before the first charge, has an average particle diameter of usually 50 nm or more, preferably 100 nm or more. The LSX material can be produced by, for example, pulverizing a mixture of a silicate and a raw material silicon into fine particles in a pulverizer such as a ball mill, followed by a heat treatment in an inert atmosphere. Without using a pulverizer, fine particles of the silicate and fine particles of the raw material silicon may be synthesized, and a mixture of these may be subjected to a heat treatment in an inert atmosphere, to form an LSX material. By adjusting the mixing ratio of the silicate and the raw material silicon or adjusting the particle size of the raw material silicon, the amount and the size of the silicon particles to be dispersed in the silicate phase can be controlled.

In view of suppressing cracking of the silicon particles themselves, the average particle diameter of the silicon particles, before the first charge, is preferably 500 nm or less, more preferably 200 nm or less. After the first charge, the average particle diameter of the silicon particles is preferably 400 nm or less. By using finer silicon particles, the changes in volume during charge and discharge are reduced, leading to further improved structural stability of the first composite material.

The average particle diameter of the silicon particles can be measured using a SEM photograph of the cross section of the first composite material. Specifically, the maximum diameter is measured with respect to randomly selected 100 silicon particles, and the arithmetic mean of the measured values may be determined as an average particle diameter of the silicon particles.

The silicon particles dispersed in the lithium ion conductive phase have a particulate phase of silicon (Si) simple substance, and usually, are each composed of multiple crystallites. The silicon particles preferably has a crystallite size of 30 nm or less. When the crystallite size of the silicon particles is 30 nm or less, the amount of changes in volume of the silicon particles associated with their expansion and contraction during charge and discharge can be reduced, and the cycle characteristics can be further improved. The lower limit of the crystallite size of the silicon particle is, for example, 1 nm or more, but not limited thereto.

The crystallite size of the silicon particles is more preferably 10 nm or more and 30 nm or less, more preferably 15 nm or more and 25 nm or less. When the crystallite size of the silicon particles is 10 nm or more, the surface area of the silicon particles can be suppressed small, and therefore, the deterioration of the silicon particles accompanying the generation of irreversible capacity is unlikely to occur.

The crystallite size of the silicon particles can be calculated from the Scherrer formula, using a half-width of a diffraction peak attributed to the Si (111) plane of an X-ray diffraction (XRD) pattern of the silicon particle.

In view of achieving a higher capacity, the content of the silicon particles in the first composite material is preferably 30 mass % or more, more preferably, 35 mass % or more, further more preferably 55 mass % or more. In this case, the lithium ions can diffuse favorably, making it easy to obtain excellent load characteristics. On the other hand, in view of improving the cycle characteristics, the content of the silicon particles in the first composite material is preferably 95 mass % or less, more preferably 75 mass % or less, further more preferably 70 mass % or less. In this case, the exposed surface area of the silicon particles without being covered with the lithium ion conductive phase decreases, and the reaction between the electrolyte and the silicon particles tends to be suppressed.

The content of the silicon particles can be measured by Si-NMR. Desirable Si-NMR measurement conditions are shown below.

Measuring apparatus: Solid nuclear magnetic resonance spectrometer (INOVA-400), available from Varian, Inc.
Probe: Varian 7 mm CPMAS-2
MAS: 4.2 kHz
MAS speed: 4 kHz
Pulse: DD (45° pulse+signal capture time 1H decoupling)
Repetition time: 1200 sec
Observation width: 100 kHz
Observation center: around −100 ppm
Signal capture time: 0.05 sec
Number of times of accumulation: 560
Sample amount: 207.6 mg The silicate phase contains at least one selected from an alkali metal element (a Group 1 element other than hydrogen in the long periodic table) and a Group 2 element in the long periodic table. Examples of the alkali metal element include lithium (Li), potassium (K), and sodium (Na). Examples of the second group element include magnesium (Mg), calcium (Ca), and barium (Ba). Particularly preferred is a lithium-containing silicate phase (hereinafter sometimes referred to as a lithium silicate phase) in terms of its small irreversible capacity, and excellent charge and discharge efficiency in the initial stage. In other words, the LSX material is preferably a composite material containing a lithium silicate phase and silicon particles dispersed in the lithium silicate phase.

The silicate phase is, for example, a lithium silicate phase (oxide phase) containing lithium (Li), silicon (Si), and oxygen (O). The atomic ratio: O/Si of O to Si in the lithium silicate phase is, for example, greater than 2 and less than 4. When the O/Si is greater than 2 and less than 4 (z in the formula below satisfies $0<z<2$), it is advantageous in the stability and the lithium ion conductivity. The O/Si is preferably greater than 2 and less than 3 (z in the formula below satisfies $0<z<1$). The atomic ratio: Li/Si of Li to Si in the lithium silicate phase is, for example, greater than 0 and less than 4.

The lithium silicate phase may further contain, in addition to Li, Si, and O, a trace amount of one or more other elements, such as iron (Fe), chromium (Cr), nickel (Ni), manganese (Mn), copper (Cu), molybdenum (Mo), zinc (Zn), aluminum (Al), zirconium (Zr), niobium (Nb), tantalum (Ta), vanadium (V), titanium (Ti), bismuth (Bi), tin (Sn), lead (Pb), antimony (Sb), cobalt (Co), fluorine (F), boron (B), phosphorus (P), and lanthanum (La).

The lithium silicate phase can have a composition represented by a formula: $Li_{2z}SiO_{2+z}$, where $0<z<2$. In view of the stability, the ease of production, and the lithium ion conductivity, z preferably satisfies $0<z<1$, and is more preferably $z=½$.

In the lithium silicate phase, there are not so many sites that can react with lithium, as compared to in the $SiO_2$ phase of $SiO_x$. Therefore, the LSX is unlikely to produce an irreversible capacity associated with charge and discharge, as compared to $SiO_x$. When silicon particles are dispersed in the lithium silicate, excellent charge and discharge efficiency can be obtained in the initial stage of charge and discharge. Furthermore, the content of the silicon particles can be changed as desired, which makes it possible to design a high-capacity negative electrode.

The composition of the silicate phase of the first composite material can be analyzed, for example, as follows.

The battery is dismantled, to take out the negative electrode, which is then washed with a non-aqueous solvent, such as ethylene carbonate, and dried. This is followed by processing with a cross section polisher (CP) to obtain a cross section of the negative electrode material mixture layer, thereby to prepare a sample. Using a field emission scanning electron microscope (FE-SEM), a reflected electron image of a cross section of the sample is obtained, to observe the cross section of the first composite material. Using an Auger electron spectroscopic (AES) analyzer, a qualitative-quantitative analysis of elements in the silicate phase of the observed first composite material is performed (acceleration voltage: 10 kV, beam current: 10 nA). The composition of the lithium silicate phase is determined, for example, based on the obtained contents of lithium (Li), silicon (Si), oxygen (O), and other elementals.

In the above cross-section observation and analysis of the sample, in order to prevent the diffusion of Li, a carbon specimen support can be used for fixing the sample. In order to prevent the quality alteration of the sample cross section, a transfer vessel that holds and conveys a sample without exposing the sample to air can be used.

(Second Composite Material)

A second composite material has a $SiO_2$ phase as a lithium ion conductive phase. That is, the second composite material (hereinafter sometimes referred to as a $SiO_x$ material) has a $SiO_2$ phase and silicon particles dispersed in the $SiO_2$ phase. The overall composition of the second composite material is represented by $SiO_x$, where x is, for example, 0.5 or greater and 1.5 or less.

The second composite material can be produced by subjecting silicon monoxide to a heat treatment, to convert it through disproportionate reaction to a $SiO_2$ phase and a fine Si phase (silicon particles) dispersed in the $SiO_2$ phase.

The silicon particles in the second composite material are smaller than those in the first composite material, and the average particle diameter of the silicon particles in the second composite material is, for example, 5 nm or so. The second composite material has a small capacity and a large irreversible capacity as compared to the first composite material, but the expansion thereof during charge is small as compared to the first composite material. Therefore, the improvement in the cycle characteristics achieved by setting to A>C≥B is less remarkable, as compared to when using the first composite material.

When the negative electrode active material includes both the first composite material and the second composite material, the amount of the second composite material relative to 100 parts by mass of the first composite material is, for example, 10 parts by mass or more and 100 parts by mass or less. By using the both in combination in such a ratio, a higher capacity of the negative electrode and the improvement in cycle characteristics can be achieved in a balanced manner.

Note that the first composite material and the second composite material are distinguishable in the cross section of a sample of the negative electrode. Usually, the average particle diameter of the silicon particles in the first composite material are larger than that in the second composite material. The observation of the particle diameter allows easy distinction between the two materials.

A non-aqueous electrolyte secondary battery according to an embodiment of the present disclosure includes the above-described negative electrode, a positive electrode, and a non-aqueous electrolyte. In the following, the negative electrode, the positive electrode and the non-aqueous electrolyte will be described.

[Negative Electrode]

The negative electrode include, for example, a negative electrode current collector, and a negative electrode material mixture layer formed on a surface of the negative electrode current collector and containing a negative electrode active material. The negative electrode material mixture layer can be formed by applying a negative electrode slurry including a negative electrode material mixture dispersed in a dispersion medium, onto a surface of the negative electrode current collector, followed by drying. The applied film after drying may be rolled, if necessary. The negative electrode material mixture layer may be formed on one surface or both surfaces of the negative electrode current collector. The negative electrode material mixture includes the negative electrode active material as an essential component, and may further include a binder, a conductive agent, a thickener, and the like, as optional components.

The negative electrode current collector is, for example, a metal foil. The negative electrode current collector may be made of, for example, stainless steel, nickel, a nickel alloy, copper, or a copper alloy. The negative electrode current collector has a thickness of, for example, 5 to 20 μm.

The binder may be a resin material, examples of which include: fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; acrylic resin, such as polyacrylic acid, polymethyl acrylate, and ethylene-acrylic acid copolymer; vinyl resin, such as polyacrylonitrile and polyvinyl acetate; polyvinyl pyrrolidone; polyether sulfone; and a rubbery material, such as styrene-butadiene copolymer rubber (SBR). These may be used singly or in combination of two or more kinds.

Examples of the conductive agent include: carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds. Note that carbon blacks and carbon fibers are capable of absorbing lithium ions, but are small in capacity, and therefore, they are usually not included in the negative electrode active material. On the other hand, the second carbon material functions also as a conductive agent.

Examples of the thickener include: cellulose derivatives (e.g., cellulose ether), such as carboxymethyl cellulose (CMC) and modified products thereof (including salts such as Na salt), and methyl cellulose; saponificated products of a polymer having a vinyl acetate unit, such as polyvinyl alcohol; and polyether (e.g., polyalkylene oxide, such as polyethylene oxide). These may be used singly or in combination of two or more kinds.

Although not particularly limited, examples of the dispersion medium include: water; alcohols, such as ethanol; ethers, such as tetrahydrofuran; amides, such as dimethylformamide; N-methyl-2-pyrrolidone (NMP); and a mixed solvent of these.

[Positive Electrode]

The positive electrode include, for example, a positive electrode current collector, and a positive electrode material mixture layer formed on a surface of the positive electrode current collector. The positive electrode material mixture layer can be formed by applying a positive electrode slurry including a positive electrode material mixture dispersed in a dispersion medium, onto a surface of the positive electrode current collector, followed by drying. The applied film after drying may be rolled, if necessary. The positive electrode material mixture layer may be formed on one surface or both surfaces of the positive electrode current collector. The positive electrode material mixture includes a positive electrode active material as an essential component, and may further include a binder, a conductive agent, a thickener, and the like, as optional components.

The positive electrode active material may be, for example, a lithium transition metal oxide containing a transition metal element, such as Co, Mn, or Ni. Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$, where M is at least one selected from the group consisting of Na, Mg, Sc, Y, Mn, Fe, Co, Ni, Cu, Zn, Al, Cr, Pb, Sb, B, Nb, Si, Ti, Sn, Zr, Mo, Ta, W, K, Ba, Sr, Bi, Be, Zn, and Ca, and x, y and z satisfy $0 < x \le 1.2$, $0 < y \le 0.9$, and $2.0 \le z \le 2.3$. These may be used singly or in combination of two or more kinds.

In view of achieving a higher capacity, the positive electrode active material is preferably a lithium-nickel composite oxide represented by $Li_xNi_{1-y}M_yO_z$, where M is at least one selected from the group consisting of Mn, Co, and Al, $0 < x \le 1.2$, and $0 < y \le 0.7$. In view of achieving a higher capacity, $0 \le y \le 0.5$ is preferred. The value "a" representing the molar ratio of lithium is subjected to increase and decrease during charge and discharge.

The binder, the conductive agent, the thickener, and the dispersion medium may be like those exemplified for the negative electrode. The conductive agent may be graphite, such as natural graphite and artificial graphite.

The positive electrode current collector is, for example, a metal foil. The positive electrode current collector may be made of, for example, stainless steel, aluminum, an aluminum alloy, or titanium. The positive electrode current collector has a thickness of, for example, 5 to 20

[Non-Aqueous Electrolyte]

The non-aqueous electrolyte contains a non-aqueous solvent, and a lithium salt dissolved in the non-aqueous solvent. The concentration of the lithium salt in the non-aqueous electrolyte is, for example, 0.5 to 2 mol/L. The non-aqueous electrolyte may contain a known additive.

Examples of the non-aqueous solvent include cyclic carbonic acid esters, chain carbonic acid esters, cyclic carboxylic acid esters, and chain carboxylic acid esters. The cyclic carbonic acid esters are exemplified by propylene carbonate (PC) and ethylene carbonate (EC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL) and γ-valerolactone (GVL). These non-aqueous solvents may be used singly or in combination of two or more kinds.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiBF_4$, $LiSbF_6$, $LiAsF_6$, $LiCF_3SO_3$, $LiCF_3CO_2$), a lithium salt of a fluorine-containing acid imide (e.g., $LiN(CF_3SO_2)_2$, $LiN(CF_3SO_2)(C_4F_9SO_2)$, $LiN(C_2F_5SO_2)_2$), and a lithium halide (e.g., LiCl, LiBr, LiI). These lithium salts may be used singly or in combination of two or more kinds.

[Separator]

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

In an exemplary structure of the non-aqueous electrolyte secondary battery, an electrode group formed by winding the positive electrode and the negative electrode with the separator interposed therebetween is housed together with the non-aqueous electrolyte in an outer case. The wound-type electrode group may be replaced with a different form of the electrode group, for example, a stacked-type electrode group formed by stacking the positive electrode and the negative electrode with the separator interposed therebetween. The non-aqueous electrolyte secondary battery may be in any form, such as cylindrical type, prismatic type, coin type, button type, or laminate type.

FIG. 1 is a partially cut-away schematic oblique view of a prismatic non-aqueous electrolyte secondary battery according to an embodiment of the present disclosure.

The battery includes a bottomed prismatic battery case 4, and an electrode group 1 and a non-aqueous electrolyte (not shown) housed in the battery case 4. The electrode group 1 has a long negative electrode, a long positive electrode, and a separator interposed therebetween and preventing them from directly contacting with each other. The electrode group 1 is formed by winding the negative electrode, the positive electrode, and the separator around a flat plate-like winding core, and then removing the winding core.

A negative electrode lead 3 is attached at its one end to the negative electrode current collector of the negative electrode, by means of welding or the like. The negative electrode lead 3 is electrically connected at its other end to a negative electrode terminal 6 disposed at a sealing plate 5, via a resin insulating plate (not shown). The negative electrode terminal 6 is electrically insulated from the sealing plate 5 by a resin gasket 7. A positive electrode lead 2 is attached at its one end to the positive electrode current collector of the positive electrode, by means of welding or the like. The positive electrode lead 2 is electrically connected at its other end, via the insulating plate, to the back side of the sealing plate 5. In other words, the positive electrode lead 2 is electrically connected to the battery case 4 serving as a positive electrode terminal. The insulating plate insulates the electrode group 1 from the sealing plate 5, and insulates the negative electrode lead 3 from the battery case 4. The sealing plate 5 is fitted at its periphery to the opening end of the battery case 4, and the fitted portion is laser-welded. In this way, the opening of the battery case 4 is sealed with the sealing plate 5. The electrolyte injection hole provided in the sealing plate 5 is closed with a sealing stopper 8.

EXAMPLES

The present disclosure will be specifically described below with reference to Examples and Comparative Examples. It is to be noted, however, the present disclosure is not limited to the following Examples.

Example 1

[First Carbon Material]

Lump artificial graphite having an average particle diameter A=23 μm was prepared. Here, lump graphite was synthesized from a raw material coke. The lump graphite was mixed with petroleum pitch, and baked in an inert atmosphere, which was then pulverized and classified, so as to have an average particle diameter of 23 μm.

[Second Carbon Material]

Flake natural graphite having an average particle diameter B=6 μm was prepared. Here, natural graphite was pulverized and classified, so as to have an average particle diameter of 6 μm.

[Lsx Material]

Step (i)

Silicon dioxide and lithium carbonate were mixed in an atomic ratio: Si/Li=1. The mixture was baked at 950° C. in air for 10 hours, to give a lithium silicate represented by $Li_2Si_2O_5$. The resultant lithium silicate was pulverized, so as to have an average particle diameter of 10 μm.

Step (ii)

Powder of $Li_2Si_2O_5$ (average particle diameter: 10 μm) serving as a lithium silicate, and powder of raw materials silicon (3N, average particle diameter: 10 μm) were mixed in a mass ratio of 50:50. The mixture was placed in a pot (made of SUS, volume: 500 mL) of a planetary ball mill (P-5, available from Fritsch Co., Ltd.), together with 24 SUS balls (diameter: 20 mm). In the pot with the lid closed, the mixture was pulverized at 200 rpm for 50 hours in an inert atmosphere.

Next, the powdered mixture was taken out in an inert atmosphere, which was then baked at 600° C. for 4 hours, with a predetermined pressure applied by a hot press machine, to give a sintered body of the mixture.

Step (iii)

Thereafter, the sintered body was pulverized and passed through a 40-μm mesh, and then, mixed with a coal pitch (MCP 250, available from JFE Chemical Corporation). The mixture was baked at 800° C. for 5 hours in an inert atmosphere, to form a conductive layer on the surface of the composite particles by coating them with a conductive carbon. The amount of the conductive layer relative to the total mass of the composite particles and the conductive layer was set to 5 mass %. Thereafter, with a sieve, an LSX material (average particle diameter C1=9 μm) having a conductive layer on its surface was obtained.

A SEM observation of a cross section of the LSX material confirmed that Si particles having an average particle diameter of 50 nm were substantially uniformly dispersed in a matrix formed of $Li_2Si_2O_5$. In an XRD pattern of the LSX material, diffraction peaks derived from Si simple substance and $Li_2Si_2O_5$ were mainly observed, and the peak intensities thereof satisfied $Li_2Si_2O_5$<Si.

An Si-NMR measurement confirmed that the content of the Si particles in the LSX material (the lithium silicate phase and the Si particles) was 50 mass %.

[$SiO_x$ Material]

Silicon monoxide was converted through a disproportionate reaction to a $SiO_2$ phase and silicon particles, to give a $SiO_x$ material (average particle diameter C2=6 μm) whose overall composition was represented by $SiO_x$, where x=1. On the surface of the $SiO_x$ material, too, a conductive layer like that on the LSX material was formed.

[Production of Negative Electrode]

A mixture of 86 parts by mass of the first carbon material, 5 parts by mass of the second carbon material, 5 parts by mass of the LSX material having the conductive layer on its surface, and 4 parts by mass of the $SiO_x$ material having the conductive layer on its surface was used as a negative electrode active material. The A/C ratio was 3, and the C/B ratio was 1.3. Here, the average particle diameter C was calculated as C=(C1 (9 μm) 5 pts·mass+C2 (6 μm) 4 pts·mass)/(5 pts·mass+4 pts·mass)=(45+24)/9=7.67.

The negative electrode active material, sodium carboxymethylcellulose (CMC-Na) and styrene-butadiene rubber (SBR) were mixed in a mass ratio of 97.5:1:1.5, to which water was added. The mixture was stirred in a mixer, to prepare a negative electrode slurry. Next, the negative electrode slurry was applied onto a surface of copper foil, and the applied film was dried, and rolled, to give a negative electrode with a negative electrode material mixture layer having a density of 1.5 g/cm³ formed on both surfaces of the copper foil.

[Production of Positive Electrode]

Lithium cobaltate, acetylene black, and polyvinylidene fluoride were mixed in a mass ratio of 95:2.5:2.5, to which N-methyl-2-pyrrolidone (NMP) was added. The mixture was stirred in a mixer, to prepare a positive electrode slurry. Next, the positive electrode slurry was applied onto a surface of aluminum foil, and the applied film was dried, and rolled, to give a positive electrode with a positive electrode material mixture layer having a density of 3.6 g/cm³ formed on both surfaces of the aluminum foil.

[Preparation of Non-Aqueous Electrolyte]

$LiPF_6$ was dissolved at a concentration of 1.0 mol/L in a mixed solvent containing ethylene carbonate (EC) and diethyl carbonate (DEC) in a volume ratio of 3:7, to prepare a non-aqueous electrolyte.

[Fabrication of Non-Aqueous Electrolyte Secondary Battery (Laminate Type Battery)]

The positive electrode and the negative electrode, with a tab attached to each electrode, were wound spirally with a separator interposed therebetween such that the tab was positioned at the outermost layer, thereby to form an electrode group. The electrode group was inserted into an outer case made of aluminum laminated film and dried under vacuum at 105° C. for two hours. The non-aqueous electrolyte was injected into the case, and the opening of the outer case was sealed. A non-aqueous electrolyte secondary battery A1 (design capacity: 800 mAh) was thus fabricated.

Example 2

A negative electrode was produced in the same manner as in Example 1, and then, a battery A2 was fabricated, except that a mixture of 81 parts by mass of the first carbon material, 10 parts by mass of the second carbon material, 5 parts by mass of the LSX material having the conductive layer on its surface, and 4 parts by mass of the $SiO_x$ material having the conductive layer on its surface was used as a negative electrode active material.

Comparative Example 1

In this example, the second carbon material was not used. Specifically, a negative electrode was produced in the same manner as in Example 1, and then, a battery B1 was fabricated, except that a mixture of 91 parts by mass of the first carbon material, 5 parts by mass of the LSX material having the conductive layer on its surface, and 4 parts by mass of the $SiO_x$ material having the conductive layer on its surface was used as a negative electrode active material.

Example 3

A negative electrode was produced in the same manner as in Example 1, and then, a battery A3 was fabricated, except that the average particle diameter of the LSX material was 12 μm. The A/C ratio was 2.5, and the C/B ratio was 1.6. Here, the average particle diameter C was calculated as C=(C1 (12 μm) 5 pts·mass+C2 (6 μm) 4 pts·mass)/(5 pts·mass+4 pts·mass)=(60+24)/9=9.33.

Example 4

A negative electrode was produced in the same manner as in Example 2, and then, a battery A4 was fabricated, except that the average particle diameter of the LSX material was 12 μm.

Comparative Example 2

A negative electrode was produced in the same manner as in Comparative Example 1, and then, a battery B2 was fabricated, except that the average particle diameter of the LSX material was 12 μm.

[Cycle Characteristics]

A total of 100 cycles of charge and discharge were performed under the following conditions, and the discharge capacity after the charge and discharge cycles was measured.

<Charge>

In a 25° C. environment, a constant-current charge was performed at a current of 400 mA until the voltage reached 4.2 V, and then a constant-voltage charge was performed at a voltage of 4.2 V until the current reached 40 mA. After the charge, the battery was allowed to rest for 20 minutes in a 25° C. environment.

<Discharge>

After the rest, in a 25° C. environment, a constant-current discharge was performed at 800 mA until the voltage reached 2.5 V.

Using the discharge capacities before and after the charge and discharge cycles obtained in the above, a capacity retention ratio was calculated from the equation below.

Capacity retention ratio (%) after charge and discharge cycles=(Discharge capacity after charge and discharge cycles/Initial discharge capacity)·100

Evaluation results are shown in Table 1. In Table 1, the content of the second carbon material in the negative electrode active material is denoted by w2.

TABLE 1

| | A (μm) | B (μm) | C1 (μm) | C2 (μm) | w2 (wt %) | Capacity retention ratio (%) | Initial capacity (index) |
|---|---|---|---|---|---|---|---|
| B1 (b1) | 23 | — | 9 | 6 | 0 | 86.5 | 100 |
| A1 (a1) | 23 | 6 | 9 | 6 | 5 | 87.0 | 101 |
| A2 (a2) | 23 | 6 | 9 | 6 | 10 | 87.9 | 100 |
| B2 | 23 | 6 | 12 | 6 | 0 | 84.7 | — |
| A3 | 23 | 6 | 12 | 6 | 5 | 87.0 | — |
| A4 | 23 | 6 | 12 | 6 | 10 | 87.9 | — |

[Initial Capacity]

Monopolar cells a1, a2 and b1 were fabricated using the negative electrodes of Examples 1 and 2 and Comparative Example 1, with metal lithium included as a counter electrode.

Each of the monopolar cells was subjected to the charge and discharge under the following conditions, to measure an initial discharge capacity.

<Charge>

In a 25° C. environment, a constant-current charge was performed at a rate of 0.1 C until the voltage reached 5 mV. After the charge, the battery was allowed to rest for 20 minutes in a 25° C. environment.

<Discharge>

After the rest, in a 25° C. environment, a constant-current discharge was performed at a rate of 0.1 C until the voltage reached 1 V.

Figure 2:
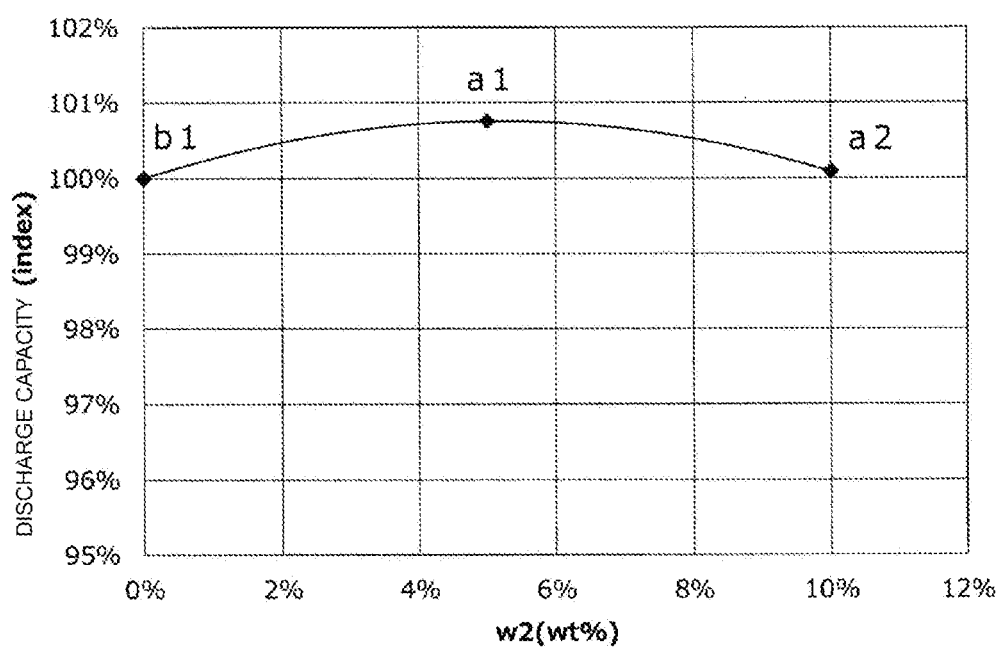
FIG. 2 A graph showing a relationship between a content w2 of the second carbon material in the negative electrode active material and an initial discharge capacity.

The initial capacity of each monopolar cell was determined as a relative value (Index), with the initial discharge capacity of the monopolar cell including the negative electrode of Comparative Example 1 taken as 100. FIG. 2 shows a relationship between the content w2 of the second carbon material in the negative electrode active material and the initial discharge capacity.

In the battery a1, the initial capacity was increased as compared to in the battery b1, and in the battery A1, the capacity retention ratio also improved as compared to in the battery B1. In the battery a2, no significant increase in the initial capacity was observed, but in the battery A2, as shown in Table 1, the capacity retention ratio was remarkably improved. These results show that by using the second carbon material in an appropriate amount, excellent discharge capacity and excellent cycle characteristics can be both achieved. At this time, the content (w2) of the second carbon material in the negative electrode active material is preferably 15 mass % or less, which can be set to, for example, 5 mass % or more, and may be, for example, 10 mass % or less. A similar tendency was observed in the comparison among the batteries A3, B2 and A4.

The comparison between the batteries A1, A2 and B1 and the batteries A3, A4 and B2 show a tendency in which the cycle characteristics improvement effect exerted by using the second carbon material is more remarkable when used in combination with the silicon-containing material with a larger average particle diameter.

INDUSTRIAL APPLICABILITY

The negative electrode for a non-aqueous electrolyte secondary battery according to the present disclosure is useful for a non-aqueous electrolyte secondary battery serving as a main power source for mobile communication equipment, portable electronic equipment, and other devices.

REFERENCE SIGNS LIST 1 electrode group
2 positive electrode lead
3 negative electrode lead
4 battery case
5 sealing plate
6 negative electrode terminal
7 gasket
8 sealing stopper

The invention claimed is:

1. A negative electrode for a secondary battery, comprising:
  a negative electrode active material capable of absorbing and releasing lithium ions, wherein
  the negative electrode active material includes a first carbon material as a main component, and includes a second carbon material and a silicon-containing material which are present between particles of the first carbon material,
  the silicon-containing material includes a lithium ion conductive phase and silicon particles dispersed in the lithium ion conductive phase,
  the lithium ion conductive phase includes at least one of the group consisting of a silicate and a silicon dioxide, and
  the first carbon material has an average particle diameter A, the second carbon material has an average particle diameter B, and the silicon-containing material has an average particle diameter C, satisfying A>C≥B.

2. The negative electrode for a secondary battery according to claim 1, wherein a ratio: A/C of the average particle diameter A of the first carbon material to the average particle diameter C of the silicon-containing material is 1.8 or greater and 4 or less.

3. The negative electrode for a secondary battery according to claim 1, wherein a ratio: C/B of the average particle diameter C of the silicon-containing material to the average particle diameter B of the second carbon material is 1 or greater and 5 or less.

4. The negative electrode for a secondary battery according to claim 1, wherein a ratio: A/B of the average particle diameter A of the first carbon material to the average particle diameter B of the second carbon material is 2 or greater and 15 or less.

5. The negative electrode for a secondary battery according to claim 1, wherein, the average particle diameter A of the first carbon material is 26 μm or less.

6. The negative electrode for a secondary battery according to claim 1, wherein, the average particle diameter B of the second carbon material is 2 μm or more and 8 μm or less.

7. A non-aqueous electrolyte secondary battery, comprising: the negative electrode of claim 1; a positive electrode; and a non-aqueous electrolyte.

8. A negative electrode for a secondary battery, comprising:
a negative electrode active material capable of absorbing and releasing lithium ions, wherein
the negative electrode active material includes a first carbon material as a main component, and includes a second carbon material and a silicon-containing material which are present between particles of the first carbon material,
the first carbon material has an average particle diameter A, the second carbon material has an average particle diameter B, and the silicon-containing material has an average particle diameter C, satisfying A>C≥B, and
the average particle diameter B of the second carbon material is 2 μm or more and 10 μm or less.

9. A non-aqueous electrolyte secondary battery, comprising: the negative electrode of claim 8; a positive electrode; and a non-aqueous electrolyte.

* * * * *